US012620612B2

(12) United States Patent (10) Patent No.: US 12,620,612 B2
Shim (45) Date of Patent: May 5, 2026

(54) FUEL CELL STACK

(71) Applicants: Hyundai Motor Company, Seoul (KR); Kia Corporation, Seoul (KR)

(72) Inventor: Kyu Hwan Shim, Yongin (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 661 days.

(21) Appl. No.: 17/851,602

(22) Filed: Jun. 28, 2022

(65) Prior Publication Data

US 2023/0282866 A1 Sep. 7, 2023

(30) Foreign Application Priority Data

Mar. 3, 2022 (KR) ........................ 10-2022-0027555

(51) Int. Cl.
| | |
|---|---|
| *H01M 8/2484* | (2016.01) |
| *H01M 8/04007* | (2016.01) |
| *H01M 8/04014* | (2016.01) |
| *H01M 8/04082* | (2016.01) |
| *H01M 8/04089* | (2016.01) |
| *H01M 8/1004* | (2016.01) |
| *H01M 8/1007* | (2016.01) |

(52) U.S. Cl.
CPC ..... *H01M 8/2484* (2016.02); *H01M 8/04014* (2013.01); *H01M 8/04074* (2013.01); *H01M 8/04089* (2013.01); *H01M 8/04201* (2013.01); *H01M 8/1004* (2013.01); *H01M 8/1007* (2016.02)

(58) Field of Classification Search
CPC ............. H01M 8/2484; H01M 8/1007; H01M 8/04014; H01M 8/04074; H01M 8/04089; H01M 8/04201; H01M 8/1004
See application file for complete search history.

(56) References Cited

U.S. PATENT DOCUMENTS 4,245,009 A * 1/1981 Guthrie ............. H01M 8/04074
426/26
4,670,361 A * 6/1987 Tsutsumi ............ H01M 8/2484
429/513
(Continued)

FOREIGN PATENT DOCUMENTS

| CN | 100414762 C * 8/2008 |
|---|---|
| GB | 2501706 B * 9/2019 .......... H01M 8/2475 |
(Continued)

OTHER PUBLICATIONS

Machine translation of JP-2011065869-A (Feb. 12, 2025) (Year: 2025).*

(Continued)

*Primary Examiner* — Matthew J Merkling
(74) *Attorney, Agent, or Firm* — Fox Rothschild LLP

(57) ABSTRACT

The present disclosure relates to a fuel cell stack including a reaction unit comprising a plurality of unit cells and configured to define reaction regions for electrochemical reactions of reactant gases, and manifold blocks disposed at two opposite ends of the reaction unit and provided independently of the reaction unit, the manifold blocks having manifold flow paths for supplying and discharging the reactant gases, thereby obtaining an advantageous effect of simplifying a structure and a manufacturing process and improving safety, maintainability, and reliability.

11 Claims, 10 Drawing Sheets

(56) References Cited

U.S. PATENT DOCUMENTS

| | | | | |
|---|---|---|---|---|
| 6,045,934 | A * | 4/2000 | Enami | H01M 8/04119 |
| | | | | 429/465 |
| 6,238,817 | B1 * | 5/2001 | Reiser | H01M 8/04089 |
| | | | | 429/408 |
| 10,211,478 | B2 * | 2/2019 | Armstrong | H01M 8/021 |
| 2002/0172852 | A1 * | 11/2002 | Frank | H01M 8/0267 |
| | | | | 429/514 |
| 2003/0044657 | A1 * | 3/2003 | Hayashi | H01M 8/241 |
| | | | | 429/461 |
| 2004/0048136 | A1 * | 3/2004 | Grasso | H01M 8/2485 |
| | | | | 204/267 |
| 2007/0134524 | A1 * | 6/2007 | Cho | H01M 8/2484 |
| | | | | 429/456 |
| 2009/0226795 | A1 * | 9/2009 | Chen | H01M 8/04201 |
| | | | | 429/458 |
| 2015/0132673 | A1 * | 5/2015 | Hood | H01M 8/04014 |
| | | | | 429/535 |
| 2015/0372327 | A1 * | 12/2015 | Kupcho | H01M 8/04089 |
| | | | | 429/429 |
| 2019/0214669 | A1 * | 7/2019 | Suzuki | H01M 8/241 |
| 2020/0280078 | A1 * | 9/2020 | Gretzer | H01M 8/0258 |
| 2021/0119242 | A1 * | 4/2021 | Baeck | H01M 8/2475 |
| 2021/0226244 | A1 * | 7/2021 | Uchiyama | H01M 8/248 |
| 2021/0408571 | A1 * | 12/2021 | Gretzer | H01M 8/0258 |

FOREIGN PATENT DOCUMENTS

| | | | | | | |
|---|---|---|---|---|---|---|
| JP | 2011065869 | A | * | 3/2011 | | |
| JP | 2011171026 | A | * | 9/2011 | | |
| JP | 2012150961 | A | * | 8/2012 | | |
| KR | 101466507 | B1 | * | 11/2014 | | |
| KR | 10-2022-0086365 | A | | 6/2022 | | |
| TW | 201004015 | A | * | 1/2010 | ........ | H01M 8/04201 |

OTHER PUBLICATIONS

Machine Translation of JP-2012150961-A (Feb. 12, 2025) (Year: 2025).*

Machine Translation of KR-101466507-B1 (Feb. 12, 2025) (Year: 2025).*

Machine Translation of JP2011171026A1 (Feb. 12, 2025) (Year: 2025).*

Machine Translation of CN100414762C (May 23, 2025) (Year: 2025).*

Machine Translation of JP-2012150961-A (Feb. 3, 2026) (Year: 2026).*

Machine Translation of TW-201004015-A (Feb. 3, 2026) (Year: 2026).*

* cited by examiner 130 120 130          130 120 130

500 400          110          140          110

FUEL CELL STACK

CROSS-REFERENCE TO RELATED APPLICATION

This application is based on and claims under 35 U.S.C. § 119 (a) the benefit of Korean Patent Application No. 10-2022-0027555 filed in the Korean Intellectual Property Office on Mar. 3, 2022, the entire contents of which are incorporated herein by reference.

TECHNICAL FIELD

Embodiments of the present disclosure relate to a fuel cell stack, and more particularly, to a fuel cell stack capable of simplifying a structure and a manufacturing process and improving safety, maintainability, and reliability.

DESCRIPTION OF RELATED ART

A fuel cell stack refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may include a membrane electrode assembly (MEA) having an electrolyte membrane that allows hydrogen positive ions to move therethrough, and electrodes (catalyst electrode layers) provided on two opposite surfaces of the electrolyte membrane to enable a reaction between hydrogen and oxygen. The fuel cell may also include gas diffusion layers (GDLs) disposed to be in close contact with two opposite surfaces of the membrane electrode assembly and configured to distribute reactant gases and transfer the generated electrical energy, and separators (bipolar plates) disposed to be in close contact with the gas diffusion layers and configured to define flow paths.

The separators may include an anode separator configured to supply hydrogen which is fuel, and a cathode separator configured to supply air which is an oxidant. The separator includes channels through which the fuel or the oxidant flows.

In addition, manifold flow paths for supplying and discharging reactant gases (e.g., hydrogen and air) and manifold flow paths for supplying and discharging a coolant are disposed at two opposite ends of the separator.

However, in the related art, the manifold flow path and the coolant flow path, through which the reactant gas and the coolant are supplied and discharged, need to be directly formed in the separator. For this reason, there is a problem in that a structure of the separator and a process of manufacturing the separator are complicated, and there is also a problem in that it is difficult to reduce a size and weight of the separator to a certain degree or more.

Moreover, in the related art, gaskets need to be installed around a reaction region between the stacked separators (reaction regions for electrochemical reactions of the reactant gases) and also need to be installed around the manifold flow path and the coolant flow path to prevent leaks of the reactant gas and the coolant. For this reason, there are problems in that the manufacturing process is complicated, the productivity and production efficiency deteriorate, and costs are increased.

Therefore, recently, various studies have been conducted to simplify the structure of the fuel cell stack and the process of manufacturing the fuel cell stack, but the study results are still insufficient. Accordingly, there is a need to develop a technology to simplify the structure of the fuel cell stack and the process of manufacturing the fuel cell stack.

SUMMARY

Embodiments of the present disclosure have been made in an effort to provide a fuel cell stack capable of simplifying a structure and a manufacturing process and improving safety and reliability.

In particular, embodiments of the present disclosure have been made in an effort to provide a fuel cell stack, in which a manifold flow path and a coolant flow path, through which reactant gases and a coolant are supplied and discharged, are independently separated from a separator, and the separator has only a reaction region.

Embodiments of the present disclosure have also been made in an effort to simplify a structure of a separator and reduce a size and weight of the separator.

Embodiments of the present disclosure have also been made in an effort to improve structural rigidity of a fuel cell stack and stably maintain fastening strength.

Embodiments of the present disclosure have also been made in an effort to make it easy to handle (e.g., dismantle or disassemble) a fuel cell stack, simplify processes (maintenance processes) of inspecting and replacing the fuel cell stack, and reduce the time and cost required for the processes.

Embodiments of the present disclosure have also been made in an effort to minimize a distribution deviation (flow rate deviation) of reactant gases and ensure stable output performance.

The objects to be achieved by the embodiments are not limited to the above-mentioned objects, but also include objects or effects that may be understood from the solutions or embodiments described below.

In one aspect, a fuel cell stack is provided comprising: (a) a reaction unit comprising a plurality of unit cells and configured to define reaction regions for electrochemical reactions of reactant gases; and (b) manifold blocks disposed at two opposite ends of the reaction unit and provided independently of the reaction unit, the manifold blocks having manifold flow paths for supplying and discharging the reactant gases.

In a preferred system, a plurality of the unit cells are in a stacked arrangement.

In a further aspect, a fuel cell stack is provided that suitable comprises: a reaction unit comprising or made by stacking a plurality of unit cells and configured to define reaction regions for electrochemical reactions of reactant gases; and manifold blocks respectively disposed at two opposite ends of the reaction unit and provided independently of the reaction unit, the manifold blocks having manifold flow paths for supplying and discharging the reactant gases.

This is to simplify a structure of the fuel cell stack and a process of manufacturing the fuel cell stack and improve stability and reliability.

That is, in the related art, the manifold flow path and the coolant flow path, through which the reactant gas and the coolant are supplied and discharged, need to be directly formed in the separator. For this reason, there is a problem in that a structure of the separator and a process of manufacturing the separator are complicated, and there is also a problem in that it is difficult to reduce a size and weight of the separator to a certain degree or more.

Moreover, in the related art, gaskets need to be installed around a reaction region between the stacked separators (reaction regions for electrochemical reactions of the reactant gases) and also need to be installed around the manifold flow path and the coolant flow path to prevent leaks of the reactant gas and the coolant. For this reason, there are problems in that the manufacturing process is complicated, the productivity and production efficiency deteriorate, and costs are increased.

However, according to the embodiment of the present disclosure, the manifold blocks separably provided independently of the reaction unit may have the manifold flow paths for supplying and discharging the reactant gases, such that only the reaction regions may be provided in the separator. Therefore, it is possible to obtain an advantageous effect of simplifying the structure of the separator and reducing the size and weight of the separator.

Moreover, according to the embodiment of the present disclosure, the manifold flow paths for supplying and discharging the reactant gases may be provided in the manifold blocks, and only the reaction regions for the electrochemical reactions of the reactant gases may be provided in the separator, such that it is not necessary to additionally provide gaskets for sealing peripheries of the manifold flow paths between the plurality of stacked separators. Therefore, it is possible to obtain an advantageous effect of further simplifying the structure and the manufacturing process and reducing the costs.

In addition, in the embodiment of the present disclosure, the manifold flow paths of the manifold blocks may each be provided in the form of a single hole that penetrates the single block formed as a single integrated body, instead of constituting a structure in which holes are penetratively formed in the plurality of separators. Therefore, it is not necessary to additionally provide gaskets for sealing the peripheries of the manifold flow paths of the manifold blocks. Therefore, it is possible to obtain an advantageous effect of simplifying the structure and the manufacturing process and reducing the costs.

The unit cell may have various structures capable of generating electricity through the electrochemical reaction of the reactant gas.

According to the exemplary embodiment of the present disclosure, the unit cell may include a membrane electrode assembly (MEA) and separators stacked on two opposite surfaces of the membrane electrode assembly.

According to the exemplary embodiment of the present disclosure, the fuel cell stack may include clamp members configured to surround the plurality of unit cells and lock the plurality of unit cells.

As described above, according to the embodiment of the present disclosure, the stacked state of the plurality of unit cells may be locked (maintained) by the clamp member. Therefore, it is possible to stably maintain the arrangement state of the unit cells and make it easy to handle (e.g., dismantle or disassemble) the fuel cell stack.

Among other things, according to the embodiment of the present disclosure, the plurality of unit cells may be modularized (bundled) by means of the clamp member. Therefore, only the reaction unit (the plurality of unit cells) may be independently and easily detached at the time of performing maintenance on the fuel cell stack (e.g., replacing an outer endplate or the manifold block) without inconvenience of having to disassemble or reassemble the reaction unit (the plurality of unit cells).

In particular, the fuel cell stack may include inner endplates configured to cover the two opposite surfaces of the reaction unit.

According to the exemplary embodiment of the present disclosure, accommodation portions may be provided in an outer surface of the inner endplate, and ends of the clamp members may be accommodated in the accommodation portions. In particular, in a state in which the end of the clamp member is accommodated in the accommodation portion, an outer surface of the end of the clamp member may be disposed on the same plane as the outer surface of the inner endplate.

As described above, the end of the clamp member may be accommodated in the accommodation portion without protruding from the outer surface of the inner endplate. Therefore, it is possible to avoid the interference between the clamp member and an outer endplate to be described below, and the outer endplate may be in close contact with the outer surface of the inner endplate. Therefore, it is possible to minimize an increase in size of the fuel cell stack (an increase in thickness in the direction in which the unit cells are stacked) that may be caused when the inner endplate is applied. Therefore, it is possible to obtain an advantageous effect of contributing to the reduction in size of the fuel cell stack.

According to the exemplary embodiment of the present disclosure, the fuel cell stack may include the outer endplates configured to cover the outer surfaces of the manifold blocks and the outer surfaces of the inner endplates and having flow path holes respectively corresponding to the manifold flow paths.

According to the exemplary embodiment of the present disclosure, the fuel cell stack may include endplate fastening members configured to fasten the outer endplates with the reaction unit interposed therebetween.

As described above, the outer endplates may be fastened to each other by means of the endplate fastening members. Therefore, it is possible to obtain an advantageous effect of more stably maintaining the fastened state of the unit cells and minimizing gaps between the manifold flow paths and the outer endplates (ensuring sealing performance).

According to the exemplary embodiment of the present disclosure, the fuel cell stack may include manifold fastening members configured to fasten the manifold blocks with the reaction unit interposed therebetween.

As described above, the manifold blocks may be fastened to each other by means of the manifold fastening member. Therefore, it is possible to obtain an advantageous effect of more stably maintaining the arrangement state of the manifold blocks with respect to the reaction unit and minimizing gaps between the reaction unit and the manifold blocks (ensuring sealing performance).

According to the exemplary embodiment of the present disclosure, the fuel cell stack may include manifold side gaskets interposed between the outer endplates and the outer surfaces of the manifold blocks.

As described above, according to the embodiment of the present disclosure, the manifold side gasket may be provided between the outer endplate and the outer surface of the manifold block. Therefore, it is possible to obtain an advantageous effect of minimizing a leak of the reactant gas between the outer endplate and the outer surface of the manifold block.

According to the exemplary embodiment of the present disclosure, the fuel cell stack may include manifold gaskets interposed between the manifold blocks and the reaction unit.

As described above, according to the embodiment of the present disclosure, the manifold gasket may be provided between the manifold block and the reaction unit. Therefore, it is possible to obtain an advantageous effect of minimizing a leak of the reactant gas and the coolant between the manifold block and the reaction unit.

According to the exemplary embodiment of the present disclosure, the fuel cell stack may include stepped portions provided on the inner surfaces of the outer endplates that face the reaction unit. The stepped portions are in close contact with the outer surfaces of the inner endplates.

As described above, the stepped portion may be provided on the inner surface of the outer endplate, and the stepped portion may be in close contact with the outer surface of the inner endplate. Therefore, it is possible to obtain an advantageous effect of more effectively transmitting the fastening force of the outer endplate (the fastening force made by the endplate fastening member) to the reaction unit (stably maintaining the fastened state of the unit cells).

According to the exemplary embodiment of the present disclosure, the fuel cell stack may include a guide rail provided on any one of the manifold block and the reaction unit, and a guide groove provided in the other of the manifold block and the reaction unit and configured to correspond to the guide rail and accommodate the guide rail.

As described above, according to the embodiment of the present disclosure, the guide rail provided on the inner surface of the manifold block may be accommodated in the guide groove provided in the reaction unit. Therefore, it is possible to obtain an advantageous effect of stably maintaining the stacked state of the unit cells and improving structural rigidity.

Among other things, since the guide rail is accommodated in the guide groove, it is possible to prevent some of the plurality of unit cells from partially sagging or separating. Therefore, it is possible to obtain an advantageous effect of minimizing a situation in which the reaction unit (the unit cell) sags or separates from the manifold block (or the outer endplate), and further improving the fastening rigidity and structural stability of the reaction unit.

According to the exemplary embodiment of the present disclosure, the fuel cell stack may include coolant flow paths provided in the manifold blocks.

For example, the fuel cell stack may include outer endplates configured to cover outer surfaces of the manifold blocks and outer surfaces of the reaction unit and having flow path holes corresponding to the manifold flow paths, and the outer endplate may have a coolant hole configured to communicate with the coolant flow path.

According to the exemplary embodiment of the present disclosure, at least any one of two opposite ends of each of the manifold flow path and the coolant flow path based on a direction in which the unit cells are stacked may be opened.

For example, only any one of the two opposite ends of each of the manifold flow path and the coolant flow path based on the direction in which the unit cells are stacked may be opened. As another example, both the two opposite ends of each of the manifold flow path and the coolant flow path based on the direction in which the unit cells are stacked may be opened.

Alternatively, the outer endplate may have no coolant hole, and a coolant port may be provided on an outer surface at an end of the manifold block and communicate with the coolant flow path.

In particular, the coolant port may be connected to a central portion of the coolant flow path corresponding to a central portion of the reaction unit based on the direction in which the unit cells are stacked.

As described above, the coolant port may be connected to the central portion of the coolant flow path instead of being connected to the end of the coolant flow path, such that a deviation in flow rate of the coolant supplied from the coolant flow path to the respective coolant channels in the reaction region may be minimized (the coolant may be uniformly distributed to the respective coolant channels). Therefore, it is possible to obtain an advantageous effect of uniformly implementing overall performance in cooling the reaction region and ensuring stable and uniform output performance of the fuel cell stack.

In another aspect, vehicles are provided that comprise an apparatus as disclosed herein.

As discussed, the method and system suitably include use of a controller or processer.

DETAILED DESCRIPTION

Figure 1:
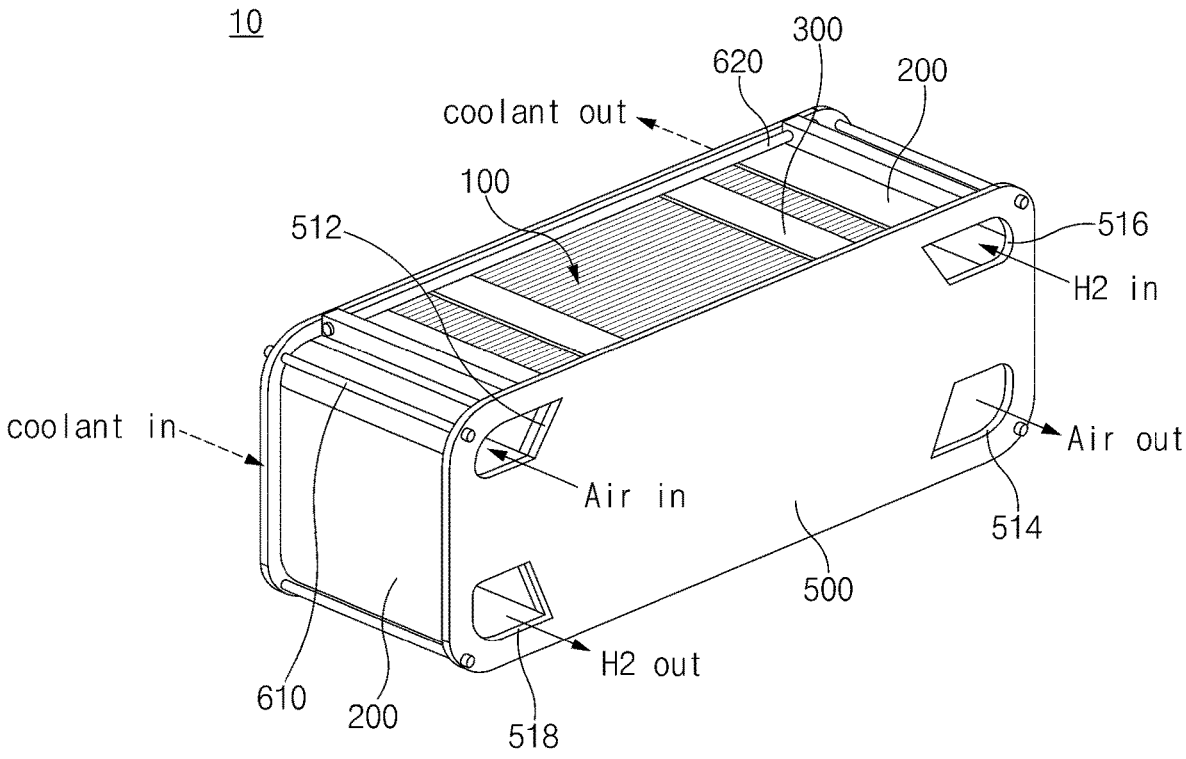
FIG. 1 is a view for explaining a fuel cell stack according to an exemplary embodiment of the present disclosure.

Hereinafter, exemplary embodiments of the present disclosure will be described in detail with reference to accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 10, a fuel cell stack 10 according to the embodiment of the present disclosure may include: a reaction unit 100 made by stacking a plurality of unit cells 110 and configured to define a reaction region for an electrochemical reaction of reactant gases; and manifold blocks 200 disposed at two opposite ends of the reaction unit 100 and provided independently of the reaction unit 100, the manifold blocks 200 having manifold flow paths 212, 214, 216, and 218 for supplying and discharging the reactant gases.

For reference, the fuel cell stack 10 according to the embodiment of the present disclosure may be applied to various mobility vehicles such as automobiles, ships, and airplanes. Embodiments of the present disclosure are not restricted or limited by the types and properties of subjects (mobility vehicles) to which the fuel cell stack 10 is applied.

The reaction unit 100 refers to a kind of power generation device that generates electrical energy through a chemical reaction of fuel (e.g., hydrogen), and the reaction unit may be configured by stacking several tens or hundreds of unit cells (fuel cells) in series in a reference stacking direction.

The unit cell 110 may have various structures capable of producing electricity by means of an oxidation-reduction reaction between fuel (e.g., hydrogen) and an oxidant (e.g., reaction air). Embodiments of the present disclosure are not restricted or limited by the structure of the unit cell 110.

According to the exemplary embodiment of the present disclosure, the unit cell 110 may include a membrane electrode assembly (MEA) 120 and separators 140 stacked on two opposite surfaces of the membrane electrode assembly.

The membrane electrode assembly (MEA) 120 may be configured to generate electricity through an oxidation-reduction reaction between fuel (e.g., hydrogen), which is a first reactant gas, and an oxidant (e.g., air) which is a second reactant gas.

The membrane electrode assembly 120 may be variously changed in structure and material in accordance with required conditions and design specifications, and embodiments of the present disclosure are not limited or restricted by the structure and material of the membrane electrode assembly 120.

For example, the membrane electrode assembly 120 may include an electrolyte membrane through which hydrogen ions move, and catalyst electrode layers attached to two opposite sides of the electrolyte membrane. The electrochemical reactions occur in the catalyst electrode layers. In addition, gas diffusion layers (GDLs) 130 may be disposed at two opposite sides of the membrane electrode assembly 120. The gas diffusion layers may serve to uniformly distribute the reactant gases and transfer generated electrical energy.

The separator 140 may serve not only to block air and hydrogen, which are the reactant gases, but to define flow paths for moving the reactant gases and a coolant and transmit electric current to an external circuit.

In addition, the separator 140 may also serve to distribute heat, which is generated in the unit cell 110, to the entire unit cell 110, and the excessively generated heat may be discharged to the outside by a coolant flowing along cooling flow paths (not illustrated) in the separator 140.

The separators 140 may be configured to supply the first reactant gas (e.g., hydrogen) and the second reactant gas (e.g., air) to the membrane electrode assembly 120, and disposed to be in close contact with one surface and the other surface of the membrane electrode assembly 120 in a direction in which the unit cells 110 are stacked.

For example, the separator 140 (e.g., a first separator) disposed on one surface of the membrane electrode assembly 120 may be any one of an anode separator configured to define a flow path for fuel (e.g., hydrogen) which is the first reactant gas and a cathode separator configured to define a flow path for an oxidant (e.g., air) which is the second reactant gas. Further, the separator 140 (e.g., a second separator) disposed on the other surface of the membrane electrode assembly 120 may be the other of the anode separator and the cathode separator.

In particular, the reaction region for the electrochemical reaction of the reactant gas (the region having a first channel or a second channel) may be defined entirely on one surface of the separator 140 that faces the membrane electrode assembly 120.

For example, the first separator may be in close contact with one surface of the membrane electrode assembly 120. The first channel (not illustrated) through which the first reactant gas (e.g., hydrogen) flows may be provided in one surface of the first separator that faces the membrane electrode assembly 120, and a cooling channel (not illustrated) through which the coolant flows may be provided in the other surface of the first separator.

The second separator may be in close contact with the other surface of the membrane electrode assembly 120. The second channel (not illustrated) through which the second reactant gas (e.g., air) flows may be provided in one surface of the second separator that faces the membrane electrode assembly 120, and a cooling channel (not illustrated) through which the coolant flows may be provided in the other surface of the second separator.

Hereinafter, an example will be described in which the separator 140 is provided in the form of a thin metal film. Alternatively, the separator 140 may be made of another material such as graphite or a carbon composite.

For reference, hydrogen, which is the fuel, and air, which is the oxidant, may be supplied to an anode (not illustrated) and a cathode (not illustrated) of the membrane electrode assembly 120, respectively, through the channels (not illustrated) in the first separator and the second separator. The hydrogen may be supplied to the anode, and the air may be supplied to the cathode.

The hydrogen supplied to the anode is separated into hydrogen ions (protons) and electrons by catalysts in the electrode layers provided on the two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer 130 and the separator 140 which are conductors.

At the cathode, the hydrogen ions supplied through the electrolyte membrane and the electrons transmitted through the separator 140 meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

The manifold blocks 200 may be respectively provided at the two opposite ends of the reaction unit 100 and disposed independently of the reaction unit 100 in order to provide the manifold flow paths 212, 214, 216, and 218 through which the reactant gases (the reactant gases supplied to the reaction region of the reaction unit 100) are supplied and discharged.

In this case, the configuration in which the manifold blocks 200 are provided independently of the reaction unit 100 may be understood as a configuration in which the manifold blocks 200 are separably provided without being connected (formed) integrally with the reaction unit 100.

The manifold blocks 200 may have various structures having the manifold flow paths 212, 214, 216, and 218 penetratively formed in the direction in which the unit cells 110 are stacked. Embodiments of the present disclosure are not restricted or limited by the structure and shape of the manifold block 200.

For example, the manifold block 200 (e.g., a first manifold block) provided at one end (e.g., a left end based on FIG. 1) of the reaction unit 100 may have an air inlet manifold flow path 212 for supplying air and a hydrogen outlet manifold flow path 218 for discharging hydrogen.

In contrast, the manifold block 200 (e.g., a second manifold block) provided at the other end (e.g., a right end based on FIG. 1) of the reaction unit 100 may have an air outlet manifold flow path 214 for discharging air and a hydrogen inlet manifold flow path 216 for supplying hydrogen.

The air supplied to the air inlet manifold flow path 212 may be supplied to the reaction region, perform the reaction, and then be discharged through the air outlet manifold flow path 214. The hydrogen supplied to the hydrogen inlet manifold flow path 216 may be supplied to the reaction region, perform the reaction, and then be discharged through the hydrogen outlet manifold flow path 218.

The manifold flow paths 212, 214, 216, and 218 may be variously changed in structures and shapes in accordance with required conditions and design specifications. Embodiments of the present disclosure are not restricted or limited by the structures and shapes of the manifold flow paths 212, 214, 216, and 218.

For example, each of the manifold flow paths 212, 214, 216, and 218 may be penetratively formed in the direction in which the unit cells 110 are stacked and thus have an approximately quadrangular hole shape. Alternatively, each of the manifold flow paths 212, 214, 216, and 218 may have a circular cross-sectional shape or other cross-sectional shapes.

As described above, according to the embodiment of the present disclosure, the manifold blocks separably provided independently of the reaction unit 100 may have the manifold flow paths 212, 214, 216, and 218 for supplying and discharging the reactant gases, such that only the reaction regions (e.g., the first channel and the second channel) may be provided in the separator 140. Therefore, it is possible to obtain an advantageous effect of simplifying the structure of the separator 140 and reducing the size and weight of the separator 140.

Moreover, according to the embodiment of the present disclosure, the manifold flow paths 212, 214, 216, and 218 for supplying and discharging the reactant gases may be provided in the manifold blocks 200, and only the reaction regions for the electrochemical reactions of the reactant gases may be provided in the separator 140, such that it is not necessary to additionally provide gaskets for sealing peripheries of the manifold flow paths 212, 214, 216, and 218 between the plurality of stacked separators 140. Therefore, it is possible to obtain an advantageous effect of further simplifying the structure and the manufacturing process and reducing the costs.

In addition, the manifold flow paths 212, 214, 216, and 218 of the manifold blocks 200 may each be provided in the form of a single hole that penetrates the single block formed as a single integrated body, instead of constituting a structure in which holes formed in the plurality of separators 140 are stacked and aligned. Therefore, it is not necessary to additionally provide gaskets for sealing the peripheries of the manifold flow paths 212, 214, 216, and 218 of the manifold blocks 200. Therefore, it is possible to obtain an advantageous effect of simplifying the structure and the manufacturing process and reducing the costs.

The manifold block 200 may be made of various materials in accordance with required conditions and design specifications. Embodiments of the present disclosure are not restricted or limited by the material of the manifold block 200.

According to the exemplary embodiment of the present disclosure, the manifold block 200 may be made of a material (e.g., plastic) lighter in weight than the separator 140 (e.g., the separator made of a metallic material).

That is, according to the embodiment of the present disclosure, unlike the separator 140 that needs to transfer heat or transmit electric current, the manifold blocks 200 only need to provide the manifold flow paths 212, 214, 216, and 218 for supplying and discharging the reactant gases. Therefore, the manifold block 200 may be made of a non-conductive material (e.g., plastic).

For example, the manifold block 200 may be manufactured by injection molding.

As described above, according to the embodiment of the present disclosure, the manifold block 200 may be made of a material lighter in weight than a material of the separator 140. Therefore, it is possible to reduce a total weight of the fuel cell stack 10 thereby contributing to the reduction in weight of the fuel cell stack 10.

Moreover, according to the embodiment of the present disclosure, each of the manifold flow paths 212, 214, 216, and 218 of the manifold blocks 200 may be provided in the form of a smooth hole having no protruding or recessed concave-convex portion on an inner wall surface, instead of constituting a structure in which flow paths penetrate the plurality of stacked separators 140. Therefore, it is possible to minimize the occurrence of differential pressure (the occurrence of differential pressure caused by concave-convex portions) when the reactant gases pass through the manifold flow paths 212, 214, 216, and 218. Therefore, it is possible to obtain an advantageous effect of improving the safety and reliability.

According to the exemplary embodiment of the present disclosure, the fuel cell stack 10 may include clamp members 300 configured to surround the plurality of unit cells 110 and lock the plurality of unit cells 110.

The clamp member 300 may have various structures capable of locking the plurality of unit cells 110. Embodiments of the present disclosure is not restricted or limited by the structure and shape of the clamp member 300.

For example, the clamp member 300 may be provided in the form of a strap (band) made of a metallic material and having an approximately "U" cross-sectional shape. More specifically, a central portion of the clamp member 300 may be disposed to surround one surfaces (e.g., top or bottom surfaces) of the plurality of unit cells 110. Two opposite ends of the clamp member 300 may be disposed to surround lateral sides of the reaction unit 100 (lateral sides of the unit cells 110 disposed at outermost peripheries among the plurality of unit cells 110).

As described above, according to the embodiment of the present disclosure, the stacked state of the plurality of unit cells 110 may be locked (maintained) by the clamp member 300. Therefore, it is possible to stably maintain the arrangement state of the unit cells 110 and make it easy to handle (e.g., dismantle or disassemble) the fuel cell stack 10.

Among other things, according to the embodiment of the present disclosure, the plurality of unit cells 110 may be modularized (bundled) by means of the clamp member 300. Therefore, only the reaction unit 100 (the plurality of unit cells) may be independently and easily detached at the time of performing maintenance on the fuel cell stack 10 (e.g., replacing an outer endplate or the manifold block) without inconvenience of having to disassemble or reassemble the reaction unit 100 (the plurality of unit cells).

In particular, the fuel cell stack 10 may include inner endplates 400 configured to cover the two opposite surfaces of the reaction unit 100.

For example, the inner endplate 400 may have a shape corresponding to the unit cell 110. The inner endplates 400 may cover outer surfaces of the unit cells 110 disposed at the outermost peripheries among the plurality of unit cells 110 that constitutes the reaction unit 100.

More particularly, the respective inner endplates 400 may be integrally fastened to (modularized with) the reaction unit 100 (the plurality of unit cells) by means of the clamp members 300.

According to the exemplary embodiment of the present disclosure, accommodation portions 410 may be provided in an outer surface of the inner endplate 400, and ends of the clamp members 300 may be accommodated in the accommodation portions 410. In particular, in a state in which the end of the clamp member 300 is accommodated in the accommodation portion 410, an outer surface of the end of the clamp member 300 may be disposed on the same plane as the outer surface of the inner endplate 400.

As described above, the end of the clamp member 300 may be accommodated in the accommodation portion 410 without protruding from the outer surface of the inner endplate 400. Therefore, it is possible to avoid the interference between the clamp member 300 and an outer endplate 500 to be described below, and the outer endplate 500 may be in close contact with the outer surface of the inner endplate 400. Therefore, it is possible to minimize an increase in size of the fuel cell stack 10 (an increase in thickness in the direction in which the unit cells 110 are stacked) that may be caused when the inner endplate 400 is applied. Therefore, it is possible to obtain an advantageous effect of contributing to the reduction in size of the fuel cell stack 10.

According to the exemplary embodiment of the present disclosure, the fuel cell stack 10 may include the outer endplates 500 configured to cover the outer surfaces of the manifold blocks 200 and the outer surfaces of the inner endplates 400 and having flow path holes 512, 514, 516, and 518 respectively corresponding to the manifold flow paths 212, 214, 216, and 218.

The outer endplates 500 may serve to protect the reaction unit 100 and the manifold blocks 200 from external impact or the like and define outermost peripheral sides of the fuel cell stack 10.

The outer endplate 500 may be made of various materials in accordance with required conditions and design specifications. Embodiments of the present disclosure are not restricted or limited by the material of the outer endplate 500. For example, the outer endplate 500 may be made of a typical metallic material.

The outer endplate 500 may have various structures capable of covering the outer surface of the manifold block 200 and the outer surface of the inner endplate 400. Embodiments of the present disclosure are not restricted or limited by the structure and shape of the outer endplate 500.

For example, the outer endplate 500 may have a structure corresponding to a shape defined by the reaction unit 100 and the manifold blocks 200 coupled to the two opposite ends of the reaction unit 100. The entire outer surfaces of the manifold blocks 200 and the entire outer surface of the inner endplate 400 may be covered by the outer endplate 500.

In addition, the plurality of flow path holes 512, 514, 516, and 518 respectively corresponding to the manifold flow paths 212, 214, 216, and 218 (the air inlet manifold flow path, the air outlet manifold flow path, the hydrogen inlet manifold flow path, and the hydrogen outlet manifold flow path) may be penetratively formed in the outer endplates.

According to the exemplary embodiment of the present disclosure, the fuel cell stack 10 may include endplate fastening members 610 configured to fasten the outer endplates 500 with the reaction unit 100 interposed therebetween.

Various fastening members capable of fastening the outer endplates 500 may be used as the endplate fastening member 610. Embodiments of the present disclosure are not restricted or limited by the type and structure of the endplate fastening member 610.

For example, a fastening member provided in the form of a straight rod having a circular cross-section may be used as the endplate fastening member 610. For example, one end and the other end of the endplate fastening member 610 may be fastened to the corresponding outer endplates 500 by a screw fastening method.

According to another embodiment of the present disclosure, the endplate fastening member may be provided in the form of a strap member or other members.

As described above, the outer endplates 500 may be fastened to each other by means of the endplate fastening members 610. Therefore, it is possible to obtain an advantageous effect of more stably maintaining the fastened state of the unit cells 110 and minimizing gaps between the manifold flow paths 212, 214, 216, and 218 and the outer endplates 500 (ensuring sealing performance).

According to the exemplary embodiment of the present disclosure, the fuel cell stack 10 may include manifold fastening members 620 configured to fasten the manifold blocks 200 with the reaction unit 100 interposed therebetween.

Various fastening members capable of fastening the manifold blocks 200 may be used as the manifold fastening member 620. Embodiments of the present disclosure are not restricted or limited by the type and structure of the manifold fastening member 620.

For example, a fastening member provided in the form of a straight rod having a circular cross-section may be used as the manifold fastening member 620. For example, one end and the other end of the manifold fastening member 620 may be fastened to the corresponding manifold blocks 200 by a screw fastening method.

According to the exemplary embodiment of the present disclosure, the fuel cell stack 10 may include support blocks 204 respectively protruding from the outer surfaces of the manifold blocks 200, and the manifold fastening member 620 may be fastened to the support blocks 204.

According to another embodiment of the present disclosure, the manifold fastening member may be provided in the form of a strap member or other members.

As described above, the manifold blocks 200 may be fastened to each other by means of the manifold fastening member 620. Therefore, it is possible to obtain an advantageous effect of more stably maintaining the arrangement state of the manifold blocks 200 with respect to the reaction unit 100 and minimizing gaps between the reaction unit 100 and the manifold blocks 200 (ensuring sealing performance).

According to the exemplary embodiment of the present disclosure, the fuel cell stack 10 may include manifold side gaskets 710 interposed between the outer endplates 500 and the outer surfaces of the manifold blocks 200.

The manifold side gasket 710 may serve to seal a portion between the outer endplate 500 and the outer surface of the manifold block 200. In particular, the manifold side gasket 710 may be provided on the entire outer surface of the manifold block 200 being in contact with an inner surface of the outer endplate 500.

The manifold side gasket 710 may be manufactured in various ways in accordance with required conditions and design specifications. Embodiments of the present disclosure are not restricted or limited by the method of manufacturing the manifold side gasket 710.

For example, the manifold side gasket 710 may be manufactured by applying or transferring a sealant made of an elastic material such as rubber, silicone, or urethane onto the outer surface of the manifold block 200 or performing a printing process on the outer surface of the manifold block 200 with the sealant.

According to another embodiment of the present disclosure, the manifold side gasket may be provided on the outer surface of the manifold block by injection molding. Alternatively, the manifold side gasket may be manufactured (by injection molding, for example) separately from the manifold block and then attached (bonded) to the manifold block.

As described above, according to the embodiment of the present disclosure, the manifold side gasket 710 may be provided between the outer endplate 500 and the outer surface of the manifold block 200. Therefore, it is possible to obtain an advantageous effect of minimizing a leak of the reactant gas between the outer endplate 500 and the outer surface of the manifold block 200.

According to the exemplary embodiment of the present disclosure, the fuel cell stack 10 may include manifold gaskets 720 interposed between the manifold blocks 200 and the reaction unit 100.

The manifold gasket 720 may serve to seal a portion between the manifold block 200 and the reaction unit 100. In particular, the manifold gasket 720 may be provided on the entire contact portion of the manifold block 200 being in contact with the reaction unit 100 (the end of the separator).

The manifold gasket 720 may be manufactured in various ways in accordance with required conditions and design specifications. Embodiments of the present disclosure are not restricted or limited by the method of manufacturing the manifold gasket 720.

For example, the manifold gasket 720 may be manufactured by applying or transferring a sealant made of an elastic material such as rubber, silicone, or urethane onto the outer surface of the manifold block 200 or performing a printing process on the outer surface of the manifold block 200 with the sealant.

According to another embodiment of the present disclosure, the manifold gasket may be provided on an inner surface (a surface facing an end of the reaction unit) of the manifold block. Alternatively, the manifold gasket may be manufactured (by injection molding, for example) separately from the manifold block and then attached (bonded) to the manifold block.

As described above, according to the embodiment of the present disclosure, the manifold gasket 720 may be provided between the manifold block 200 and the reaction unit 100. Therefore, it is possible to obtain an advantageous effect of minimizing a leak of the reactant gas and the coolant between the manifold block 200 and the reaction unit 100.

According to the exemplary embodiment of the present disclosure, the fuel cell stack 10 may include stepped portions 502 provided on the inner surfaces of the outer endplates 500 that face the reaction unit 100. The stepped portions 502 are in close contact with the outer surfaces of the inner endplates 400.

For example, the stepped portion 502 may protrude from the inner surface of the outer endplate 500 and have a shape corresponding to the separator 140. The stepped portion 502 may be in close contact with the entire outer surface of the inner endplate 400. According to another embodiment of the present disclosure, the stepped portion may partially protrude from a part of the inner surface of the outer endplate instead of protruding from the entire inner surface of the outer endplate.

As described above, the stepped portion 502 may be provided on the inner surface of the outer endplate 500, and the stepped portion 502 is in close contact with the outer surface of the inner endplate 400. Therefore, it is possible to obtain an advantageous effect of more effectively transmitting the fastening force of the outer endplate 500 (the fastening force made by the endplate fastening member 610) to the reaction unit 100 (stably maintaining the fastened state of the unit cells 110).

Figure 4:
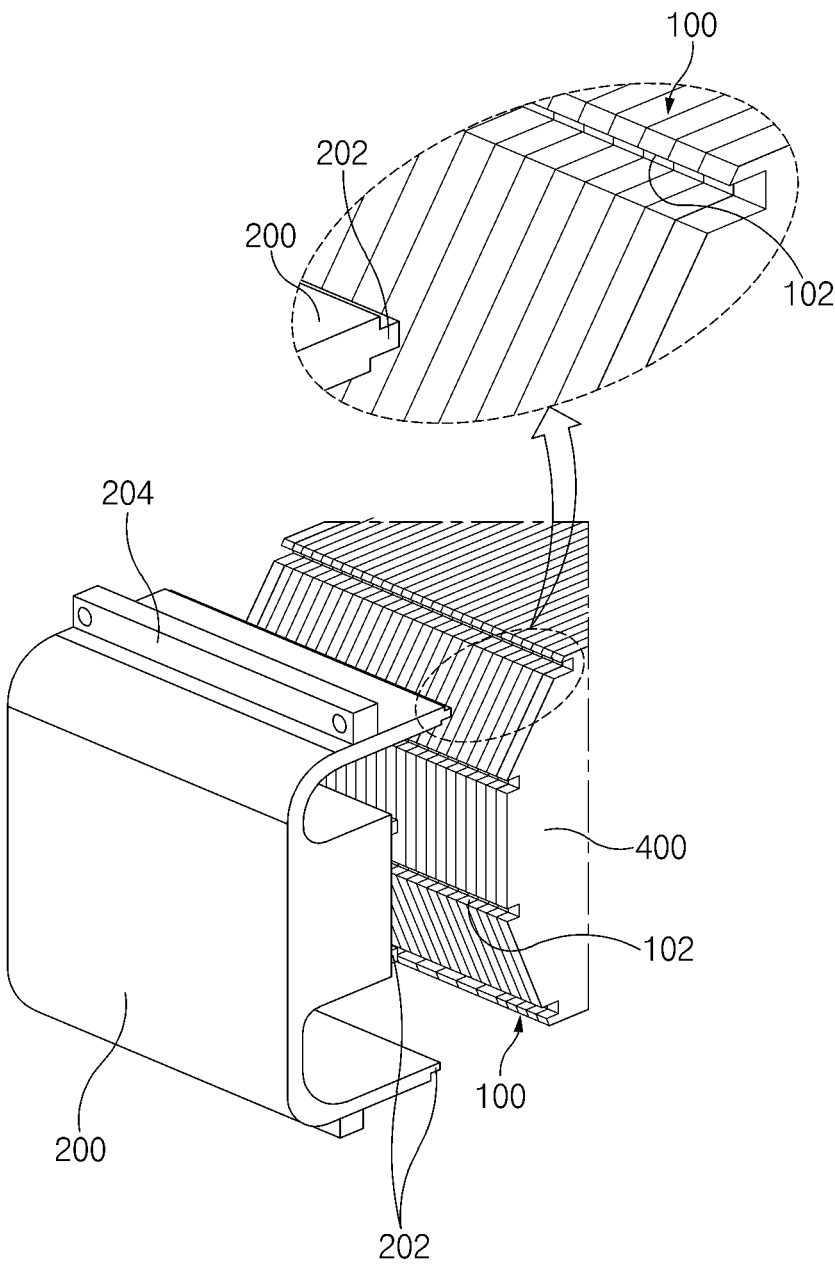
FIG. 4 is a view for explaining a guide rail and a guide groove of the fuel cell stack according to the embodiment of the present disclosure.
Figure 5:
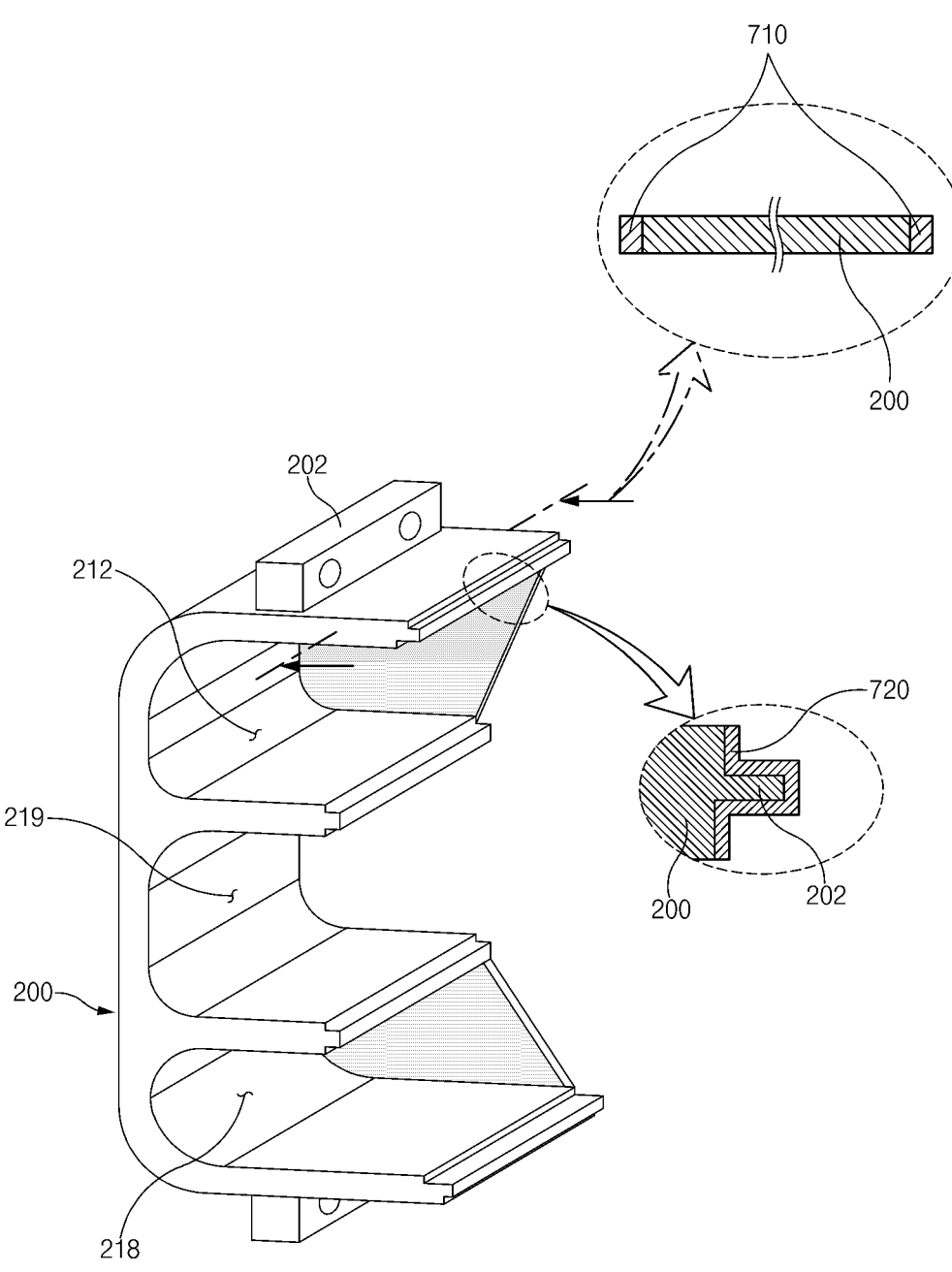
FIG. 5 is a view for explaining a manifold gasket and a manifold side gasket of the fuel cell stack according to the embodiment of the present disclosure.
Figure 6:
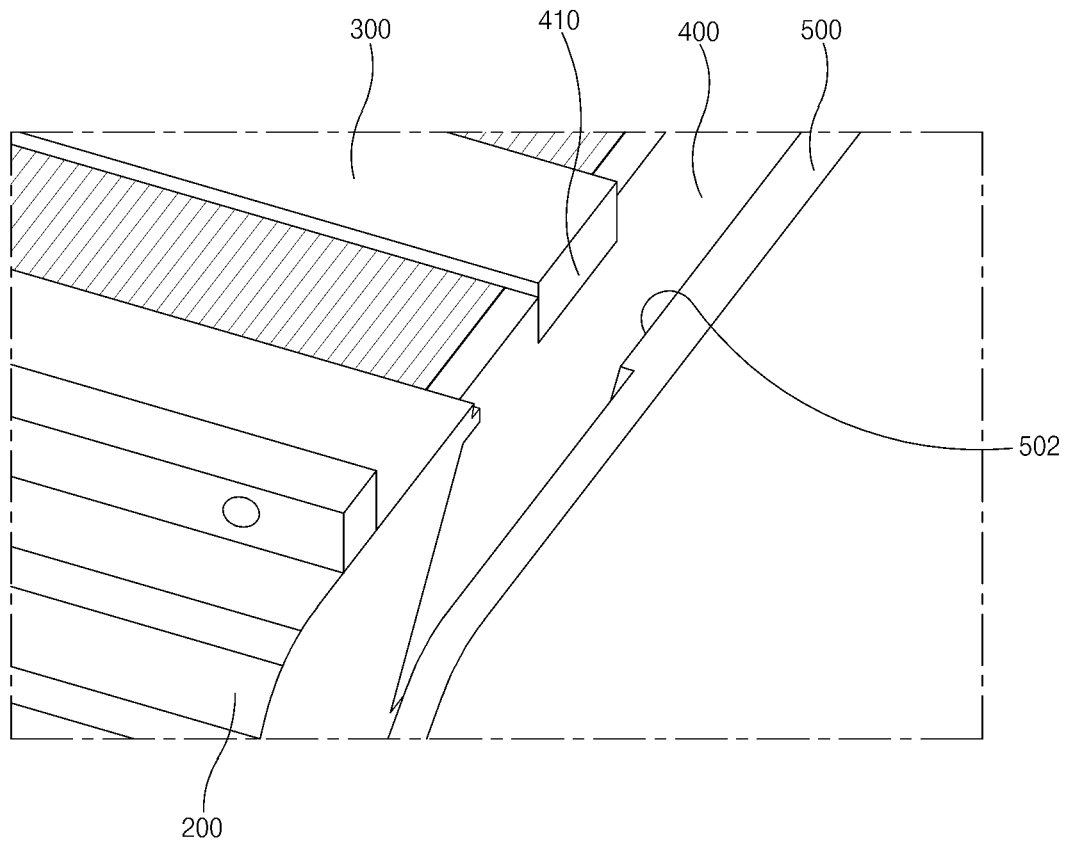
FIG. 6 is a view for explaining a stepped portion of the fuel cell stack according to the embodiment of the present disclosure.

Referring to FIG. 4, according to the exemplary embodiment of the present disclosure, the fuel cell stack 10 may include a guide rail 202 provided on any one of the manifold block 200 and the reaction unit 100, and a guide groove 102 provided in the other of the manifold block 200 and the reaction unit 100 and configured to correspond to the guide rail 202 and accommodate the guide rail 202.

Hereinafter, an example will be described in which the guide rail 202 is provided in the direction in which the unit cells 110 are stacked, the guide rail 202 is provided on the inner surface of the manifold block 200 that faces the end of the reaction unit 100, and the guide groove 102 configured to accommodate the guide rail 202 is provided at the end of the reaction unit 100 and corresponds to the guide rail 202. Alternatively, the guide groove may be provided in the manifold block, and the guide rail may be provided on the reaction unit.

For example, the guide rail 202 may have a shape straight in the direction in which the unit cells 110 are stacked. Alternatively, the guide rail 202 may have a curved shape or other shapes.

As described above, according to the embodiment of the present disclosure, the guide rail 202 provided on the inner surface of the manifold block 200 may be accommodated in the guide groove 102 provided in the reaction unit 100. Therefore, it is possible to obtain an advantageous effect of stably maintaining the stacked state of the unit cells 110 and improving structural rigidity.

Among other things, since the guide rail 202 is accommodated in the guide groove 102, it is possible to prevent some of the plurality of unit cells 110 from partially sagging or separating. Therefore, it is possible to obtain an advantageous effect of minimizing a situation in which the reaction unit 100 (the unit cell) sags or separates from the manifold block 200 (or the outer endplate), and further improving the fastening rigidity and structural stability of the reaction unit 100.

In the embodiment of the present disclosure illustrated and described above, the example has been described in which the guide rail 202 is provided on the manifold block 200, and the guide groove 102 is provided in the reaction unit 100. However, according to another embodiment of the present disclosure, the guide groove may be provided in the manifold block, and the guide rail may be provided on the reaction unit.

According to the exemplary embodiment of the present disclosure, the fuel cell stack 10 may include coolant flow paths 219 provided in the manifold blocks 200.

The coolant flow path 219 may have various structures capable of supplying the coolant to the reaction region. Embodiments of the present disclosure are not restricted or limited by the coolant flow path 219.

For example, the manifold block 200 (e.g., the first manifold block) provided at one end (e.g., the left end based on FIG. 1) of the reaction unit 100 may have a coolant inlet manifold flow path (not illustrated) for supplying the coolant, and the manifold block 200 (e.g., the second manifold block) provided at the other end (e.g., the right end based on FIG. 1) of the reaction unit 100 may have a coolant outlet manifold flow path (not illustrated) for discharging the coolant. In addition, the outer endplate 500 may have coolant holes 519 configured to communicate with the coolant flow paths 219. The coolant supplied to the coolant inlet manifold flow path via the coolant hole 519 may pass through the reaction region and then be discharged through the coolant outlet manifold flow path.

Hereinafter, an example will be described in which only one end of the coolant flow path 219 corresponding to the coolant hole 519 of the outer endplate 500 (one end of the coolant flow path based on the direction in which the unit cells are stacked) is opened, and the other end of the coolant flow path 219 is closed.

Figure 9:
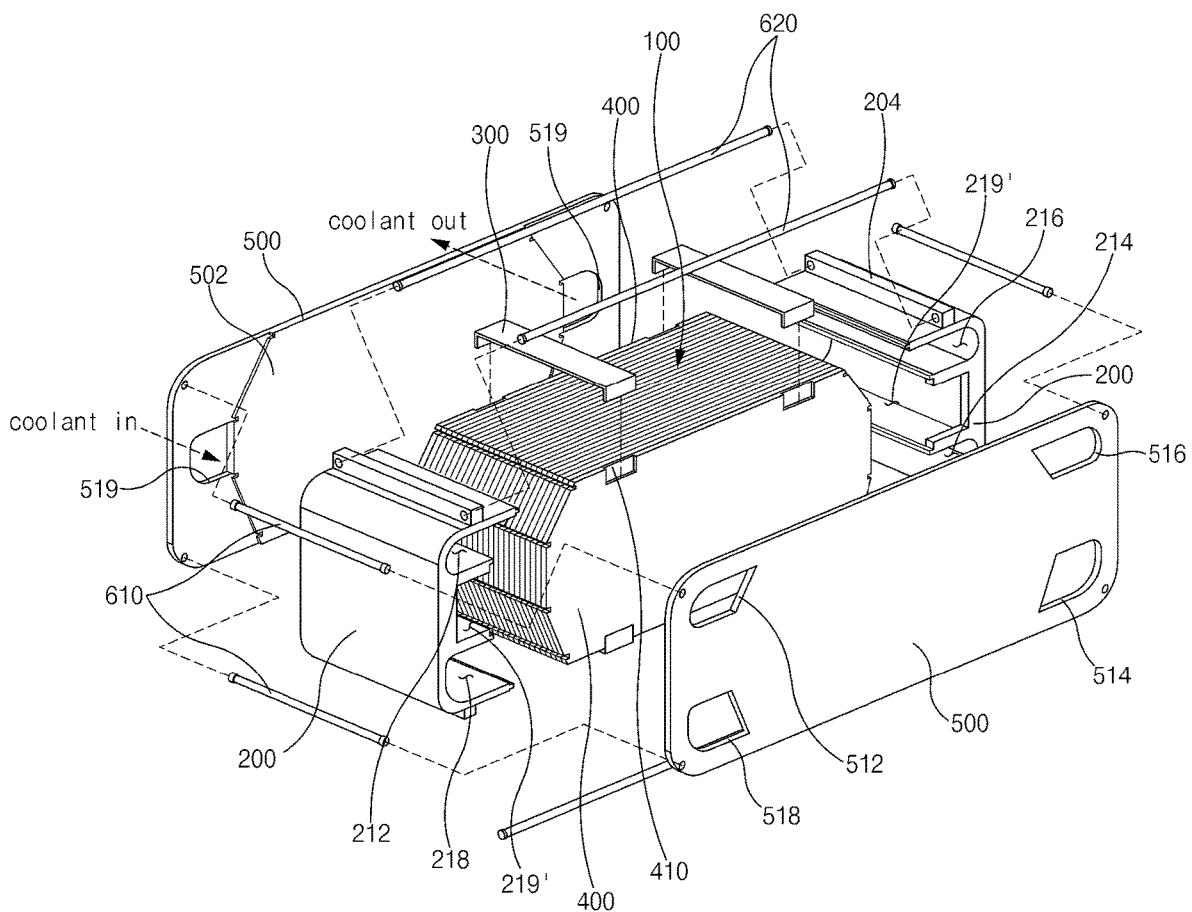
FIG. 9 is a view for explaining a modified example of a coolant flow path of the fuel cell stack according to the embodiment of the present disclosure.

Meanwhile, in the embodiment of the present disclosure illustrated and described above, the example has been described in which only one end of the coolant flow path 219 corresponding to the coolant hole 519 of the outer endplate 500 is opened, and the other end of the coolant flow path 219 is closed. However, according to another embodiment of the present disclosure, in the case in which the fuel cell stack 10 includes the outer endplates 500, as illustrated in FIG. 9, two opposite ends of a coolant flow path 219' based on the direction in which the unit cells 110 are stacked may be opened.

In addition, in the case in which the fuel cell stack 10 includes the outer endplates 500, like the coolant flow path 219', two opposite ends (two opposite ends of the manifold flow path based on the direction in which the unit cells are stacked) of each of the manifold flow paths 212, 214, 216, and 218 may be opened.

In the embodiment of the present disclosure illustrated and described above, the example has been described in which the outer endplate 500 has the coolant hole 519 configured to communicate with the coolant flow path 219. However, according to another embodiment of the present disclosure, the coolant may be supplied directly to the manifold block 200 without passing through the outer endplate 500.

Figure 7:
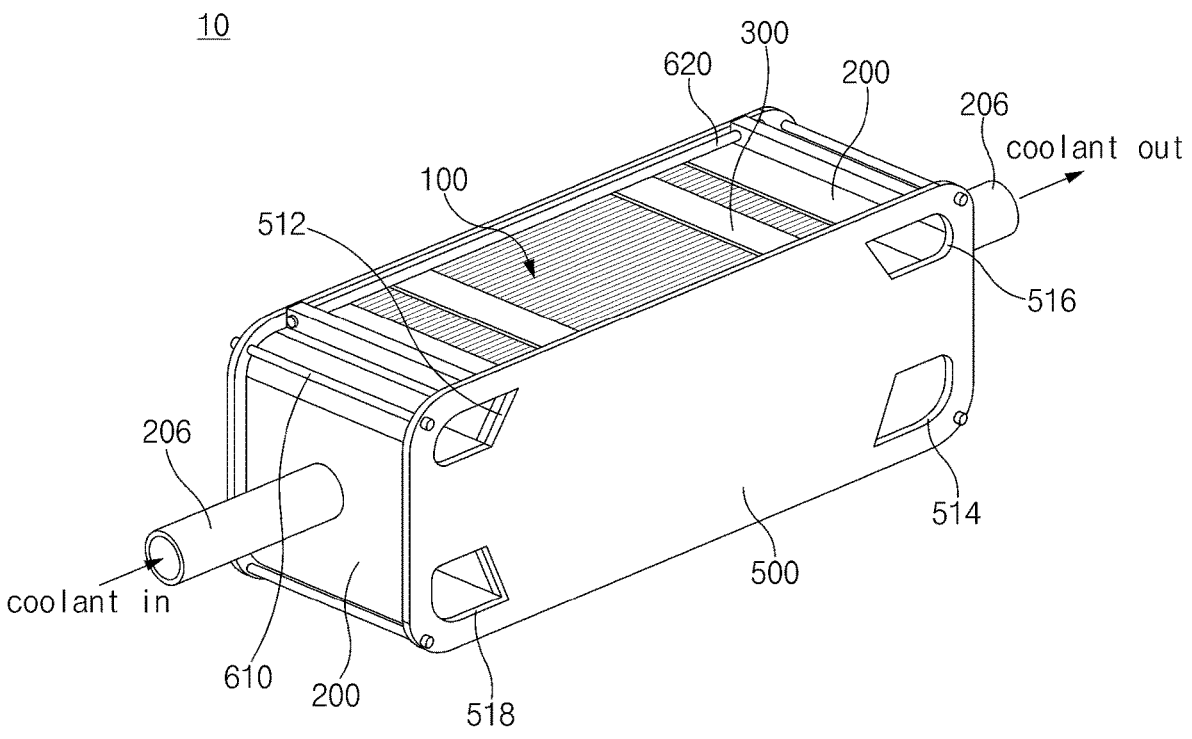
FIGS. 7 and 8 are views for explaining a coolant port of the fuel cell stack according to the embodiment of the present disclosure.
Figure 8:
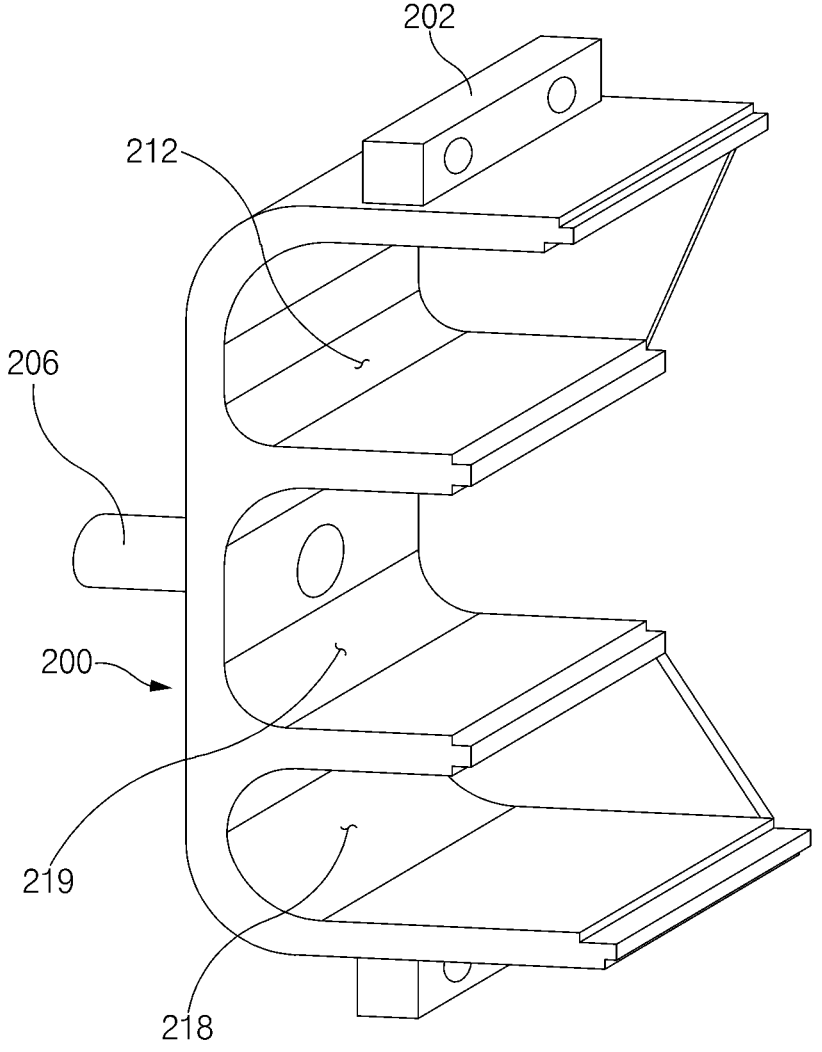

Referring to FIGS. 7 and 8, according to the exemplary embodiment of the present disclosure, the fuel cell stack 10 may include coolant ports 206 provided on outer surfaces at the ends of the manifold blocks 200 and configured to communicate with the coolant flow paths 219.

In particular, the coolant port 206 may be connected to a central portion of the coolant flow path 219 corresponding to a central portion of the reaction unit 100 based on the direction in which the unit cells 110 are stacked.

As described above, the coolant port 206 may be connected to the central portion of the coolant flow path 219 instead of being connected to the end of the coolant flow path 219, such that a deviation in flow rate of the coolant supplied from the coolant flow path 219 to the respective coolant channels in the reaction region may be minimized (the coolant may be uniformly distributed to the respective coolant channels). Therefore, it is possible to obtain an advantageous effect of uniformly implementing overall performance in cooling the reaction region and ensuring stable and uniform output performance of the fuel cell stack 10.

Meanwhile, in the embodiment of the present disclosure illustrated and described above, the example has been described in which the outer endplate 500 is disposed on the outer surface of the inner endplate 400. However, according to another embodiment of the present disclosure, the fuel cell stack excluding the outer endplate may be implemented.

Figure 2:
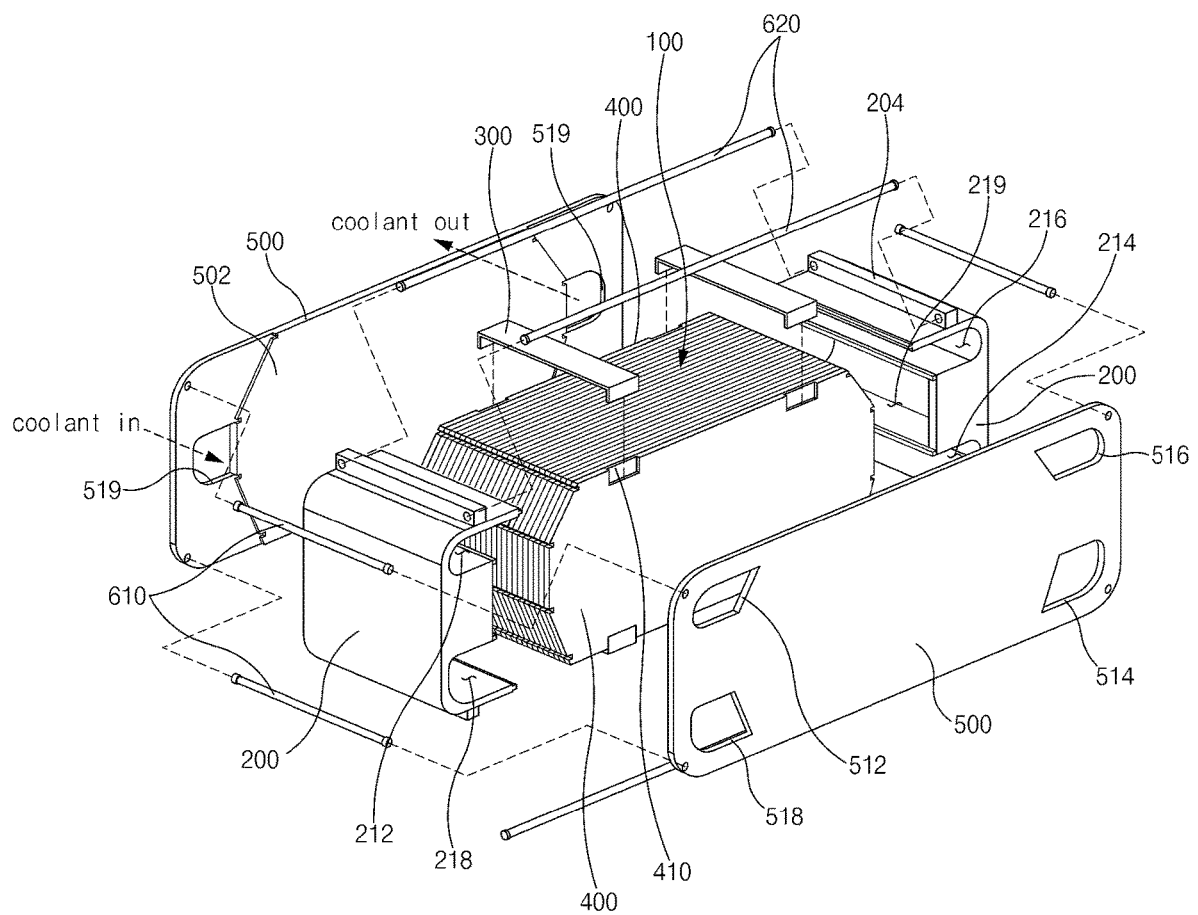
FIG. 2 is an exploded perspective view for explaining the fuel cell stack according to the embodiment of the present disclosure.
Figure 3:
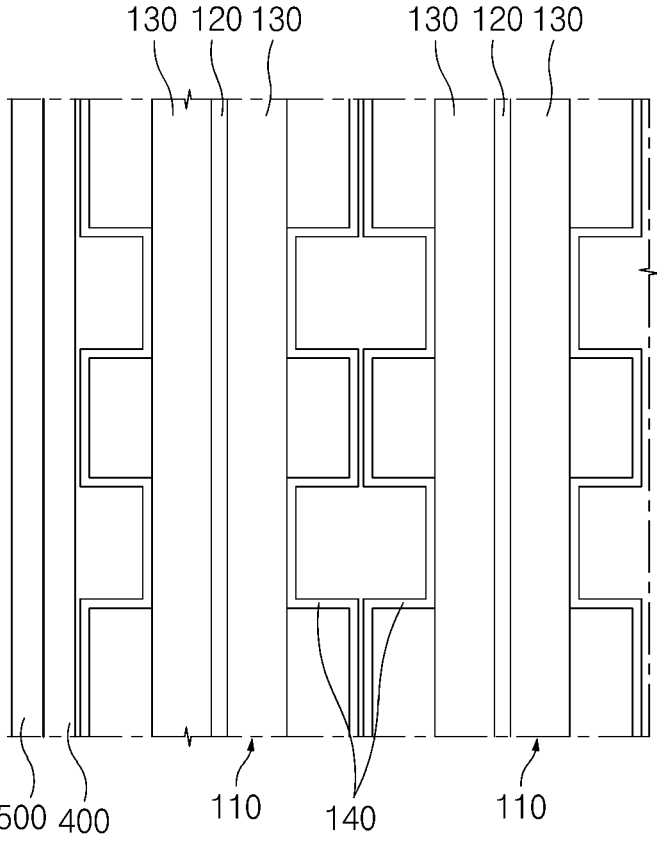
FIG. 3 is a view for explaining a reaction unit of the fuel cell stack according to the embodiment of the present disclosure.
Figure 10:
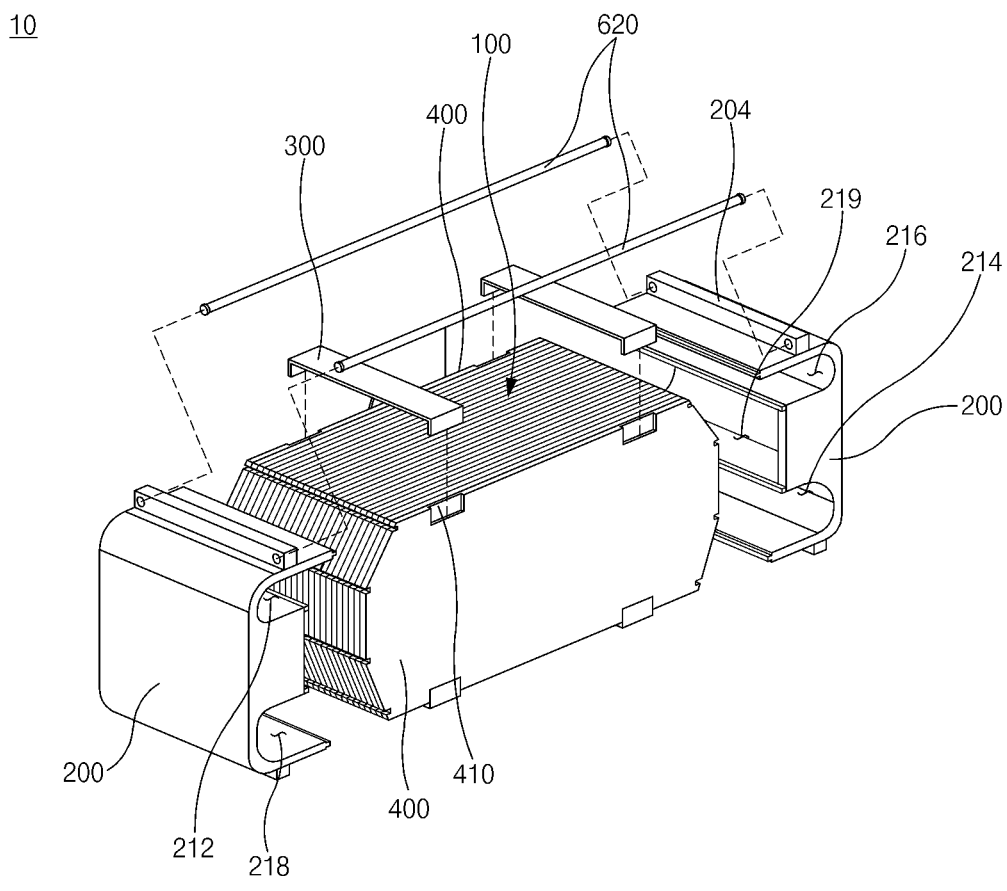
FIG. 10 is a view for explaining a fuel cell stack according to another embodiment of the present disclosure.

For example, referring to FIG. 10, the fuel cell stack 10 may include the reaction unit 100 and the manifold blocks 220 without the outer endplate 500 (see FIG. 2).

However, only one end of each of the manifold flow paths 212, 214, 216, and 218 and only one end of each of the coolant flow paths 219 (one end of the coolant flow path based on the direction in which the unit cells are stacked) may be opened, and the other end may be closed so that the flow paths for the air, hydrogen, and coolant may be ensured (e.g., the air supplied to the air inlet manifold flow path may be supplied to the reaction region, perform the reaction, and then be discharged through the air outlet manifold flow path) even though the outer endplate is excluded.

According to embodiments of the present disclosure described above, it is possible to obtain an advantageous effect of simplifying the structure and manufacturing process and improving the safety and reliability.

In particular, according to embodiments of the present disclosure, the manifold flow path and the coolant flow path, through which the reactant gases and the coolant are supplied and discharged, may be independently separated from the separator, and the separator may have only the reaction region.

Among other things, according to embodiments of the present disclosure, it is possible to obtain an advantageous effect of simplifying the structure of the separator and reducing the size and weight of the separator.

In addition, according to embodiments of the present disclosure, it is possible to obtain an advantageous effect of improving the structural rigidity of the fuel cell stack and stably maintaining the fastening strength.

In addition, according to embodiments of the present disclosure, it is possible to make it easy to handle (e.g., dismantle or disassemble) the fuel cell stack and simplify the processes (maintenance processes) of inspecting and replacing the fuel cell stack. Therefore, it is possible to obtain an advantageous effect of reducing the time and cost required for the processes.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A fuel cell stack comprising:

a reaction unit comprising a plurality of unit cells and configured to define reaction regions for electrochemical reactions of reactant gases;

manifold blocks disposed at two opposite ends of the reaction unit and provided independently of the reaction unit, the manifold blocks having manifold flow paths for supplying and discharging the reactant gases and having a coolant flow path;

a clamp member disposed to surround the plurality of unit cells and configured to lock the plurality of unit cells;

inner endplates configured to cover outer surfaces of the reaction unit;

outer endplates configured to cover outer surfaces of the manifold blocks and outer surfaces of the inner endplates and having flow path holes corresponding to the manifold flow paths and having a coolant hole configured to communicate with the coolant flow path; and a coolant port provided on an outer surface at an end of the manifold block and configured to communicate with the coolant flow path;

wherein an accommodation portion is provided in an outer surface of the inner endplate, and an end of the clamp member is accommodated in the accommodation portion, wherein an outer surface of the end of the clamp member is disposed on the same plane as the outer surface of the inner endplates in a state in which the end of the clamp member is accommodated in the accommodation portion, wherein a coolant supplied into the fuel cell stack flows through the coolant flow path of the manifold blocks, then passes through flow paths formed between the plurality of unit cells along the stacking direction of the plurality of unit cells, and is discharged, and wherein the coolant port is connected to a central portion of the coolant flow path corresponding to a central portion of the reaction unit along the stacking direction of the plurality of unit cells.

2. The fuel cell stack of claim 1 wherein the plurality of unit cells are in a stacked arrangement.

3. The fuel cell stack of claim 1, further comprising:

a manifold side gasket interposed between the outer endplates and an outer surface of the manifold block.

4. The fuel cell stack of claim 1, further comprising:

an endplate fastening member configured to fasten the outer endplates with the reaction unit interposed therebetween.

5. The fuel cell stack of claim 1, further comprising:

a stepped portion provided on an inner surface of the outer endplates that faces the reaction unit, the stepped portion being in close contact with the outer surface of the inner endplates.

6. The fuel cell stack of claim 1, further comprising:

a manifold fastening member configured to fasten the manifold blocks with the reaction unit interposed therebetween.

7. The fuel cell stack of claim 6, further comprising:

a support block protruding from an outer surface of the manifold block, wherein the manifold fastening member is fastened to the support block.

8. The fuel cell stack of claim 1, further comprising:

a manifold gasket interposed between the manifold block and the reaction unit.

9. The fuel cell stack of claim 1, further comprising:

a guide rail provided on any one of the manifold block and the reaction unit; and a guide groove provided in the other of the manifold block and the reaction unit and configured to correspond to the guide rail and accommodate the guide rail.

10. The fuel cell stack of claim 1, wherein at least any one of two opposite ends of each of the manifold flow path and the coolant flow path based on a direction in which the unit cells are stacked is opened.

11. The fuel cell stack of claim 1, wherein the unit cell comprises:

a membrane electrode assembly (MEA); and a separator stacked on the membrane electrode assembly.

* * * * *